(12) United States Patent
Pera et al.

(10) Patent No.: US 10,892,666 B2
(45) Date of Patent: Jan. 12, 2021

(54) DOUBLE-CASING FRAME OF AN ELECTRIC MACHINE

(71) Applicant: MOTEURS LEROY-SOMER, Angouleme (FR)

(72) Inventors: Thierry Pera, Belfort (FR); Philippe Ciciliani, Valentigney (FR); Yohan Kerever, Belfort (FR); Hamza Lofti, Beaucourt (FR)

(73) Assignee: MOTEURS LEROY-SOMER, Angouleme (FR)

( * ) Notice: Subject to any disclaimer, the term of this patent is extended or adjusted under 35 U.S.C. 154(b) by 6 days.

(21) Appl. No.: 16/307,413

(22) PCT Filed: Jun. 6, 2017

(86) PCT No.: PCT/EP2017/063678
§ 371 (c)(1),
(2) Date: Dec. 5, 2018

(87) PCT Pub. No.: WO2017/211800
PCT Pub. Date: Dec. 14, 2017

(65) Prior Publication Data
US 2019/0305642 A1    Oct. 3, 2019

(30) Foreign Application Priority Data

Jun. 6, 2016  (FR) .................................. 16 55170

(51) Int. Cl.
*H02K 9/19* (2006.01)
*H02K 5/20* (2006.01)
*H02K 9/16* (2006.01)

(52) U.S. Cl.
CPC ................. *H02K 9/19* (2013.01); *H02K 5/20* (2013.01); *H02K 9/16* (2013.01)

(58) Field of Classification Search
CPC ............... H02K 5/20; H02K 9/19; H02K 9/16
See application file for complete search history.

(56) References Cited

U.S. PATENT DOCUMENTS 6,160,332 A * 12/2000 Tsuruhara ................ H02K 5/20
310/54
6,198,183 B1 * 3/2001 Baeumel ............... F04D 25/068
310/52

(Continued)

FOREIGN PATENT DOCUMENTS

DE    101 41 891 A1    3/2003
DE    199 50 660 A1    2/2004

(Continued)

OTHER PUBLICATIONS

Machine Translation, Rohwer, DE-102008001093-A1, Oct. 2009. (Year: 2009).*

(Continued)

*Primary Examiner* — Thomas Truong
(74) *Attorney, Agent, or Firm* — Oblon, McClelland, Maier & Neustadt, L.L.P.

(57) ABSTRACT

Disclosed is a double-casing frame of an electric machine that is cooled by a fluid circulating in the fluid circulation space (26) inside the double casing, said double-casing frame comprising: an inner casing (22) on which an end flange (30) is mounted at the rear of the machine; and an outer casing (24) that fits over the inner casing (22) and can be separated from the inner casing (22) without removing the end flange (30).

22 Claims, 6 Drawing Sheets

(56) References Cited

U.S. PATENT DOCUMENTS

Figure 1:
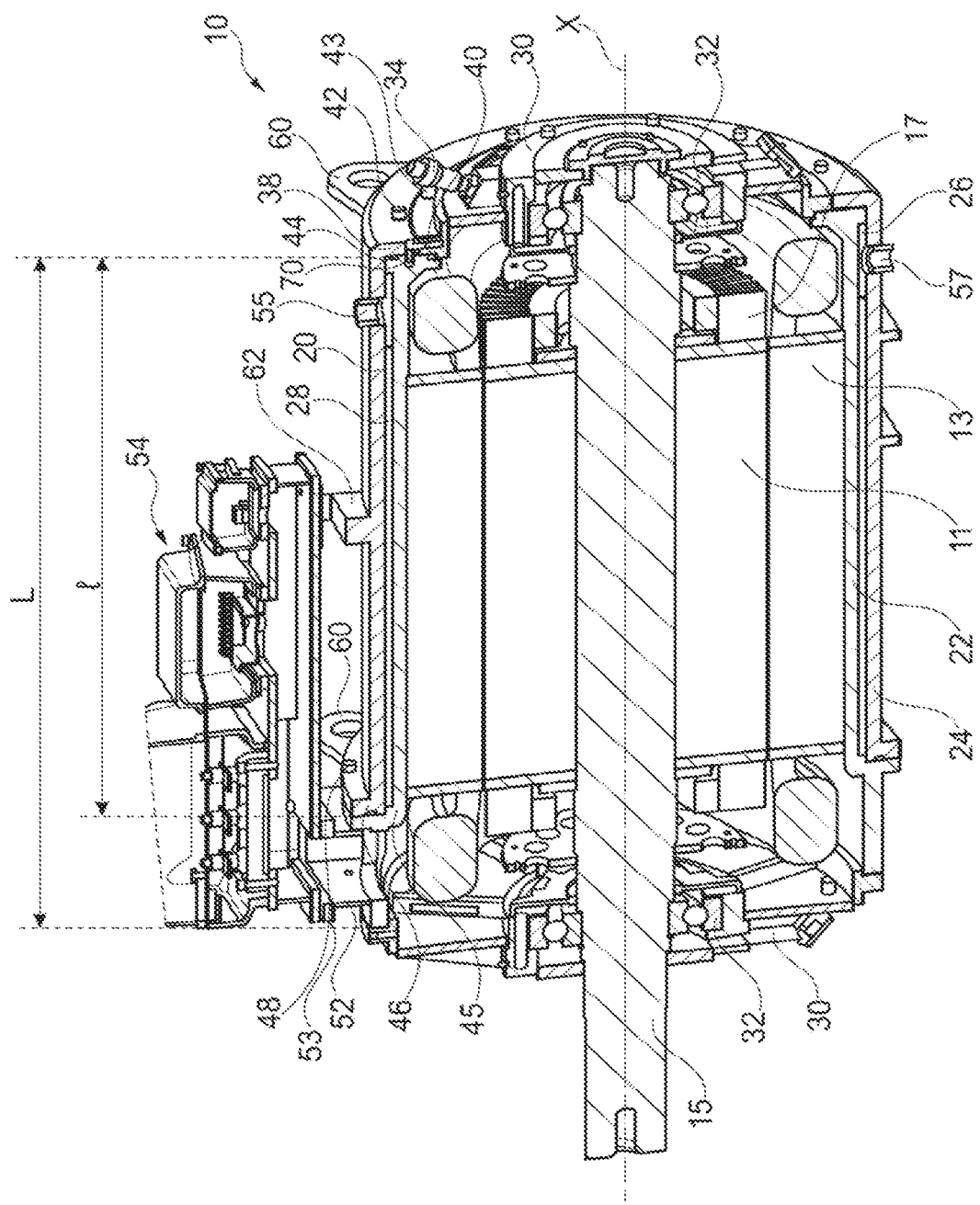

| | | | |
|---|---|---|---|
| 7,626,292 B2 | 12/2009 | Baumann et al. | |
| 2009/0127946 A1* | 5/2009 | Fee | H02K 5/20 310/64 |
| 2010/0047091 A1 | 2/2010 | Schiffhauer et al. | |
| 2010/0207465 A1* | 8/2010 | Dutau | H02K 1/20 310/64 |
| 2011/0304228 A1* | 12/2011 | Bradfield | H02K 1/20 310/54 |
| 2014/0354090 A1* | 12/2014 | Chamberlin | H02K 9/19 310/54 |
| 2015/0069862 A1* | 3/2015 | Bulatow | H02K 5/04 310/43 |
| 2019/0115801 A1* | 4/2019 | Kajimoto | H02K 17/12 |

FOREIGN PATENT DOCUMENTS

| | | | | |
|---|---|---|---|---|
| DE | 10 2007 009 394 A1 | 8/2008 | | |
| DE | 102008001093 A1 * | 10/2009 | | H02K 5/1735 |
| DE | 10 2010 040 399 A1 | 3/2012 | | |
| DE | 102010040399 A1 * | 3/2012 | | H02K 5/20 |
| DE | 10 2012 002 024 B3 | 5/2013 | | |
| EP | 0631365 A2 * | 12/1994 | | H02K 5/20 |
| EP | 1 953 897 A2 | 8/2008 | | |
| JP | 2013-42661 A | 2/2013 | | |
| WO | WO 2006/106086 A1 | 10/2006 | | |

OTHER PUBLICATIONS

Machine Translation, Schueller, DE-102010040399-A1, Mar. 2012. (Year: 2012).*

International Search Report dated Nov. 11, 2017 in PCT/EP2017/063678 filed on Jun. 6, 2017.

French Search Report dated Mar. 8, 2017 in FR 1655170 filed on Jun. 6, 2016.

Combined Chinese Office Action and Search Report dated Apr. 13, 2020 in corresponding Chinese Patent Application No. 201780035264.2 (with English Translation and English Translation of Category of Cited Documents), 23 pages.

* cited by examiner

DOUBLE-CASING FRAME OF AN ELECTRIC MACHINE

The present invention relates to a double-casing frame of an electric machine which is cooled by a fluid circulating inside the double casing. The present invention further relates to a machine comprising such a frame in addition to a method for inspecting the fluid circulation space inside the double casing. The invention further relates to a method for manufacturing such a frame.

PRIOR ART

Double-casing frames of electric machines which are cooled by a fluid circulating inside the double casing are generally produced by welding metal parts, with the parts being permanently fixed to one another. This prevents any visual inspection of the fluid circuit.

Thus a frame for an electric motor which is in two parts assembled together using weld joints to form the double casing is disclosed in the patent EP 1 953 897. Each of the parts is produced by casting.

A frame of an electric machine which is in two parts assembled together by a bolted connection is also disclosed in U.S. Pat. No. 7,626,292. The internal part of the frame is manufactured by casting. The channels for the circulation of liquid are helicoidal which requires the inlet and the outlet of liquid to be positioned remotely from one another.

SUMMARY

There is a need to provide a double-casing frame of an electric machine, which is cooled by a fluid circulating inside the double casing, which permits a visual inspection of the fluid circuit in a simple manner. There is also a need to have a frame which is capable of operating in a reliable manner in the most extreme environmental conditions, such as those encountered in the nuclear field.

The invention responds to this need, according to a first of its features, by means of a double-casing frame of an electric machine which is cooled by a fluid circulating inside the double casing, comprising
- an inner casing,
- an end flange mounted on the inner casing at the rear, and
- an outer casing which fits over the front of the inner casing and is separable from the inner casing without removing the end flange.

Since the inner casing and the outer casing are removable this permits the fluid circulation space to be inspected, in particular, in order to detect possible undesirable elements in the fluid circulation space.

Since it is not necessary to remove the end flange in order to separate the outer casing from the inner casing this simplifies the removal process when inspecting the fluid circulation space.

Preferably, the outer casing is separable from the inner casing by sliding the outer casing to the rear along the inner casing.

Preferably, the inner casing has a rear end wall oriented perpendicularly to the axis of rotation of the machine and covering the end flange over part of its height, the end flange being mounted on the rear end wall of the inner casing, in particular being fixed to the rear end wall of the inner casing.

Preferably, the outer casing is removably fixed to the inner casing and/or to the end flange, in particular by a bolted connection.

The outer casing may have a rear end wall oriented perpendicularly to the axis of rotation of the machine and at least partially covering the inner casing, in particular the rear end wall of the inner casing, the outer casing being, in particular, fixed to the inner casing by a bolted connection in the extension of the end flange. The end flange may not have any elements for fixing to the outer casing.

Preferably, the frame comprises a seal, in particular an O-ring, between the rear end wall of the inner casing and the rear end wall of the outer casing. Such a seal makes it possible to ensure the sealing of the fluid circulation space at the end of the frame. This seal may be housed in an annular groove machined in the rear end wall of the inner casing and/or the rear end wall of the outer casing.

Preferably, the outer casing forms with the end flange a radial clearance e. This radial clearance may be between 0.5 mm and 5 mm.

Since the end wall of the inner casing is in contact with a flange and the end wall of the outer casing and the end flange are separated by a radial clearance, this guarantees that fluid which might escape from the fluid circulation space in the event of a failure of the seal does not flow to the interior but to the exterior, via the radial clearance. Thus the interior of the machine remains protected relative to a possible failure of the seal.

As a variant, the outer casing has a rear end wall oriented perpendicularly to the axis of rotation of the machine and at least partially covering the end flange, in particular being fixed by a bolted connection to the end flange. The rear end wall is thus behind the rear end wall of the inner casing and the end flange.

Preferably, the inner casing comprises a front assembly flange, a front end wall of the outer casing being fixed thereto.

Preferably, the outer casing covers the inner casing over only a part of its length. This makes it possible to have a portion of the inner casing which is not covered by the outer casing in order to integrate in the machine the elements which are outside the frame, for example a terminal box, without complicating the separation of the two casings.

Preferably, the inner casing comprises a passage for cables toward a terminal box of the machine, the passage for cables being in front of the outer casing, in particular in front of the front assembly flange of the inner casing. Preferably, the outer casing comprises a terminal box support, the terminal box of the machine being removably fixed thereto. In this manner, the passage for cables is in the portion of the inner casing which is not covered by the outer casing. Thus it is not necessary to remove the terminal box from the machine when inspecting the fluid circulation space.

It is advantageous if the inner casing and the outer casing are made of stainless steel, by being forged.

The external surface of the inner casing and/or the internal surface of the outer casing preferably have ribs, in particular longitudinal ribs, forming chicanes in the fluid circulation space.

Preferably, the ribs are longitudinal in order to channel the fluid inside the double casing. When the two casings are assembled, such ribs make it possible to form chicanes extending along the path of the fluid between the two casings, in particular forcing the fluid to circulate in a zigzag path, which permits improved cooling of the electric machine.

The ribs may be such that once the inner and outer casings are assembled together the ribs are distributed equally around the frame. This permits the machine to be cooled in a uniform manner.

The frame may comprise between 6 and 16 ribs.

Preferably, the distance between two consecutive ribs in the circumferential direction is between 6 cm and 30 cm.

The circulation of the fluid is preferably carried out with the exterior, and the outer casing may comprise an orifice for the inlet of fluid into the fluid circulation space and an orifice for the outlet of fluid from this fluid circulation space.

From the longitudinal orientation of the channels, the orifices for the inlet and outlet of fluid may be substantially at the same axial position, opposite one another or in the vicinity of one another. This makes it possible to facilitate the connection of the frame to the fluid supply.

Preferably, the fluid circulation space is laterally delimited by the front assembly flange of the inner casing and the rear end wall of the outer casing and the ribs extend alternately from one or the other of the flange and the wall.

The frame may comprise at least one headless screw borne by one of the casings and the other casing may comprise a drilled hole into which this screw may be engaged. When assembling the casings, this permits an angular alignment of the inner casing relative to the outer casing.

The inner casing and/or the outer casing may comprise lifting lugs for the frame.

Electric Machine

A further subject of the invention is a double-casing electric machine which is cooled by a fluid circulating inside the double casing, comprising a frame as described above.

The electric machine may comprise a terminal box borne by the inner casing, in particular by a passage for cables toward the terminal box.

Preferably, the outer casing is separable from the inner casing without removing the terminal box. The terminal box may be removably fixed to the outer casing, in particular to a terminal box support of the outer casing.

Method for Inspecting

A further subject of the invention is a method for inspecting the fluid circulation space of a frame of an electric machine according to the invention, comprising the steps consisting in unscrewing the bolts for fixing the outer casing to the inner casing and then removing the outer casing and inspecting the fluid circulation space in order to check the absence of undesirable elements. The removal of the outer casing is carried out, in particular, by sliding the outer casing on the inner casing to the rear without removing the end flange.

The frame according to the first feature of the invention may be manufactured according to the following method.

Method for Manufacturing

A subject of the invention according to a second of its features is a method for manufacturing a double-casing frame of an electric machine which is cooled by a fluid circulating inside the double casing, in particular a frame as described above, comprising the steps consisting in machining an inner casing and an outer casing of the frame in the same initial metal part and removably fixing the inner and outer casings to one another.

Since the inner and outer casings are machined from the same initial metal part, this makes it possible to reduce the number of inventory parts which are necessary for the production of the frame, which simplifies the supply and thus the industrial manufacture of the frame. The number of quality controls carried out on the materials before machining may be reduced, which lowers the costs.

Since the inner casing and the outer casing are removably fixed together, this makes it possible to remove the two casings in order to inspect the fluid circuit and clean it if necessary, and then to reassemble said casings, and this may be carried out at any time. Such an inspection makes it possible, in particular, to check the absence of undesirable elements in this fluid circuit both before delivery and during use as mentioned above.

Preferably, the initial metal part is a metal tube. This metal part may be made of stainless steel, in particular forged.

Preferably, the inner casing is machined in a first portion of the initial metal part and the outer casing is machined in a second portion of the initial metal part, located in the extension of the first portion. Such an arrangement of the two portions permits a simple manufacture of the two casings from the same initial part.

The method comprises the step which consists in cutting the metal part between the two portions, preferably before machining the casings.

The method may comprise the step which consists in machining ribs on the internal surface of the outer casing and/or on the external surface of the inner casing, preferably longitudinal ribs, in order to channel the fluid inside the double casing. When the two casings are assembled, such ribs make it possible to form chicanes extending along the path of the fluid between the two casings, in particular forcing the fluid to circulate in a zigzag path which permits improved cooling of the electric machine.

Preferably, the fixing step of the inner and outer casings does not comprise the welding of the two casings together. Thus the removal process may not require further operations other than unscrewing.

The inner and outer casings are preferably fixed together by a bolted connection, in particular by a bolted connection of a rear end wall of the outer casing to a rear end wall of the inner casing and/or by a bolted connection of a front end wall of the outer casing to the inner casing.

The casings of the frame are preferably machined such that, after the assembly of the casings to one another, the internal surface of the outer casing and the external surface of the inner casing define a fluid circulation space, in particular between the aforementioned ribs.

The ribs may be formed such that, once the inner and outer casings are assembled together, the ribs are distributed equally around the frame. This makes it possible to cool the motor in a uniform manner.

The frame may comprise between 6 and 16 ribs.

Preferably, the distance between two consecutive ribs in the circumferential direction is between 6 cm and 30 cm. The outer casing may comprise orifices for the inlet and outlet of fluid into and from the fluid circulation space.

By the longitudinal orientation of the channels, the orifices for the inlet and outlet of fluid may be substantially at the same axial position, opposing one another or in the vicinity of one another. This makes it possible to facilitate the connection of the frame to the fluid supply.

Preferably, the fluid circulation space is laterally delimited by two walls forming assembly flanges and the ribs extend alternately from one or the other of these assembly flanges.

The manufacture of the frame of the electric machine is, however, not limited to the method described above. For example, the inner casing and the outer casing are machined from different initial metal parts.

Electric Machine Frame

A further subject of the invention according to a third of its features is a double-casing frame of an electric machine which is cooled by a fluid circulating inside the double casing and which, in particular, is obtained by the manufacturing method according to the second feature of the invention defined above, comprising:
an inner casing,
an outer casing, and
an end flange,
the inner casing and the outer casing forming together a space for the circulation of the fluid and being separable, the inner casing having an end wall oriented perpendicularly to the axis of rotation of the machine and covering, over a part of its height, the end flange and being in contact therewith, and
the outer casing having a rear end wall oriented perpendicularly to the axis of rotation of the machine and covering the rear end wall of the inner casing in the extension of the end flange, forming therewith a radial clearance.

The invention further relates to an electric machine comprising such a frame.

As mentioned above, since the inner casing and the outer casing are removable this permits the fluid circulation space to be inspected in order to detect, in particular, possible undesirable elements in the fluid circulation space.

Preferably, the frame comprises a seal, in particular an O-ring, between the rear end wall of the inner casing and the rear end wall of the outer casing. Such a seal makes it possible to ensure the sealing of the fluid circulation space at the end of the frame. This seal may be housed in an annular groove machined into the rear end wall of the inner casing and/or the rear end wall of the outer casing.

Since the end wall of the inner casing is in contact with a flange and the end wall of the outer casing and the end flange are separated by a radial clearance, this guarantees that fluid which could escape from the fluid circulation space in the case of a failure of the seal does not flow into the interior but toward the exterior, via the radial clearance. Thus, the interior of the machine remains protected relative to a possible failure of the seal.

Preferably, the radial clearance is between 0.5 and 5 mm.

As mentioned above, it is advantageous if the inner casing and the outer casing are made of stainless steel, by forging.

The external surface of the inner casing and/or the internal surface of the outer casing preferably have ribs, in particular longitudinal ribs, forming chicanes in the fluid circulation space. These ribs are preferably as defined above.

The frame may comprise at least one headless screw borne by one of the casings and the other casing may comprise a drilled hole into which this screw is able to be engaged. During the assembly of the casings, this permits an angular alignment of the inner casing relative to the outer casing.

The inner casing and/or the outer casing may comprise lifting lugs for the frame.

The circulation of the fluid is preferably carried out with the exterior and the outer casing may comprise an orifice for the inlet of fluid into the fluid circulation space and an orifice for the outlet of fluid from this fluid circulation space.

The outer casing may cover the inner casing over only part of its length.

Preferably, as mentioned above, the end wall of the outer casing is removably fixed to the inner casing by a bolted connection.

The inner casing may comprise a passage for cables toward a terminal box.

Method for Inspecting

A further subject of the invention is a method for inspecting the fluid circulation space of an electric machine frame, as defined above according to the third feature of the invention, comprising the steps consisting in separating the outer casing from the inner casing, in particular by unscrewing the bolts for fixing the outer casing to the inner casing, and inspecting the fluid circulation space in order to check the absence of undesirable elements.

Figure 2:
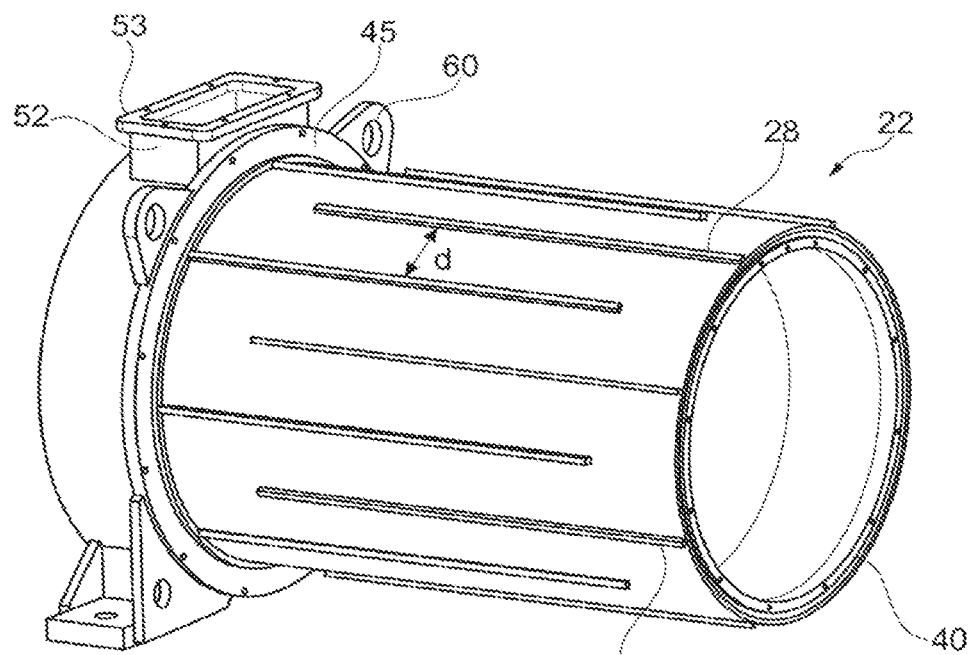
Figure 3:
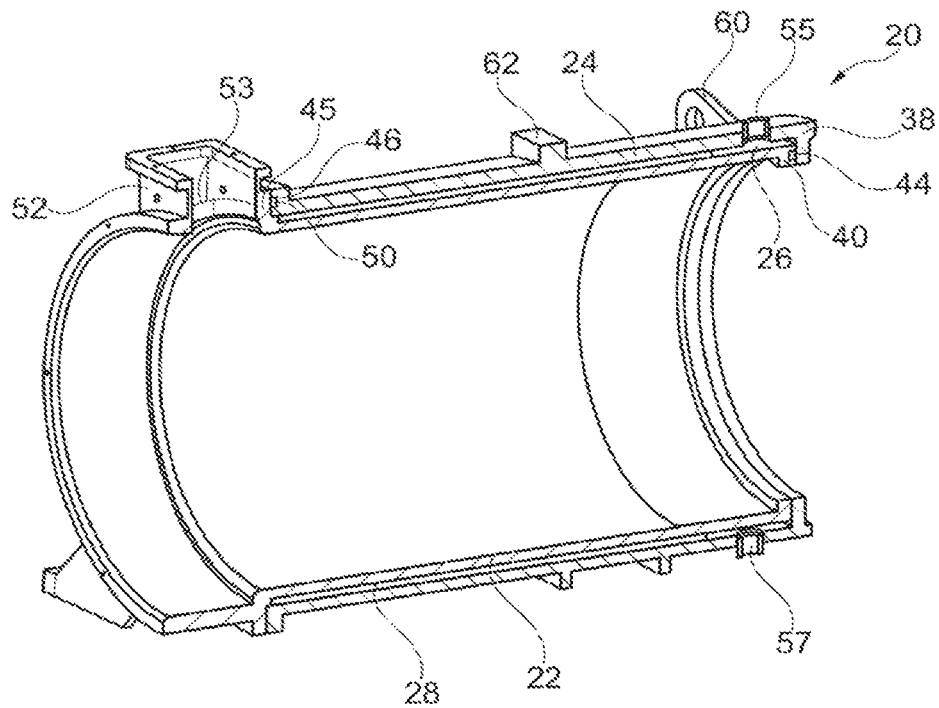
Figure 4:
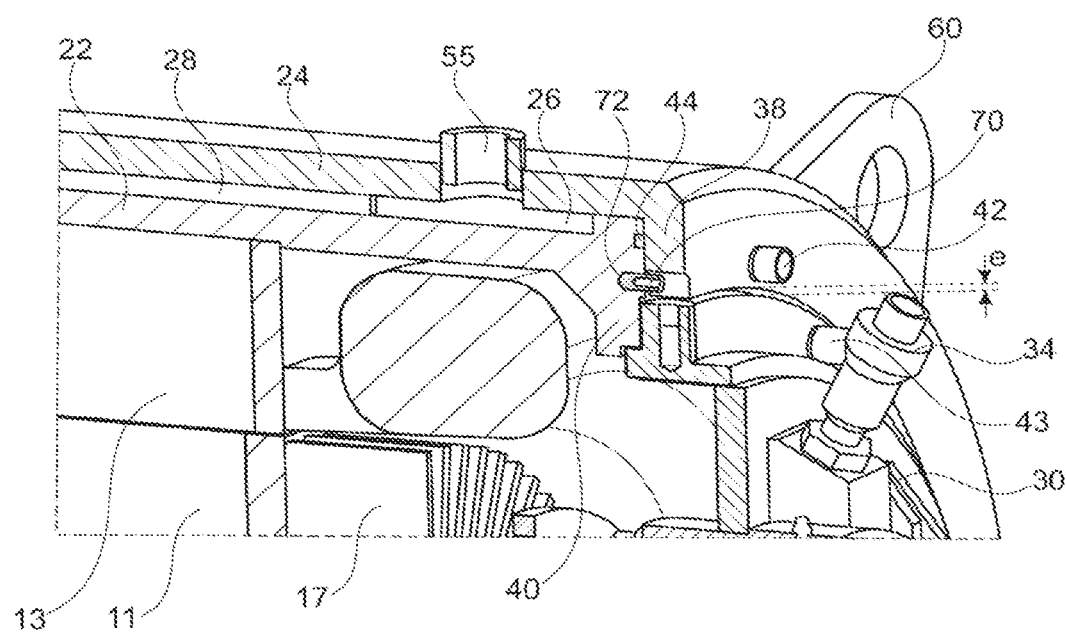
Figure 5:
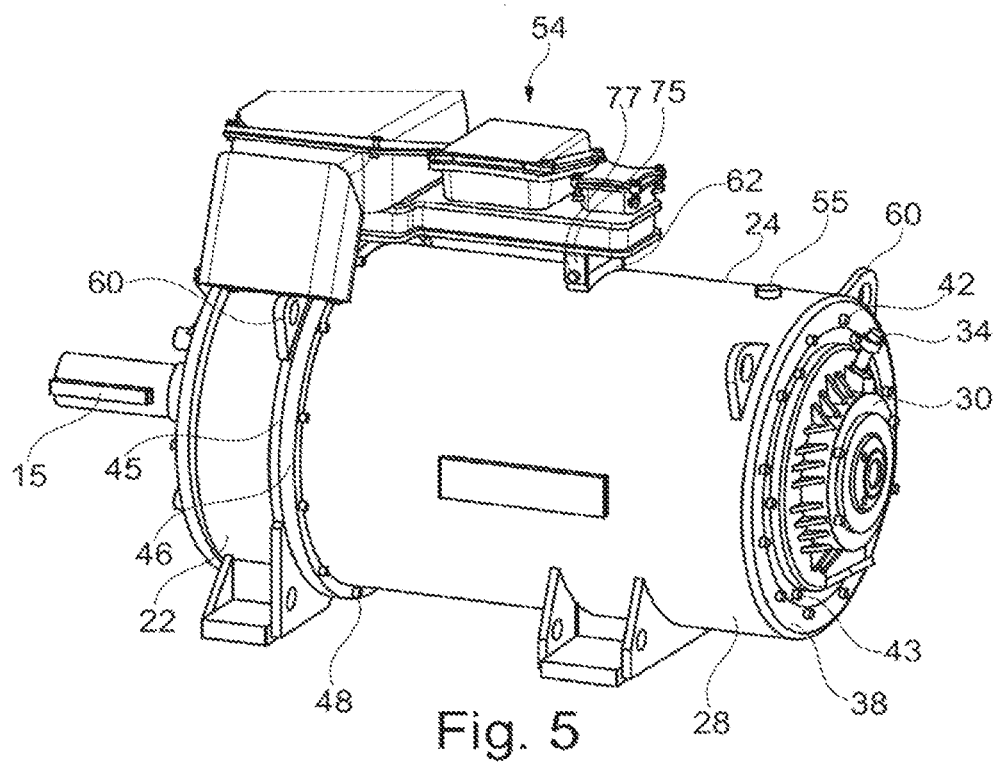
Figure 6:
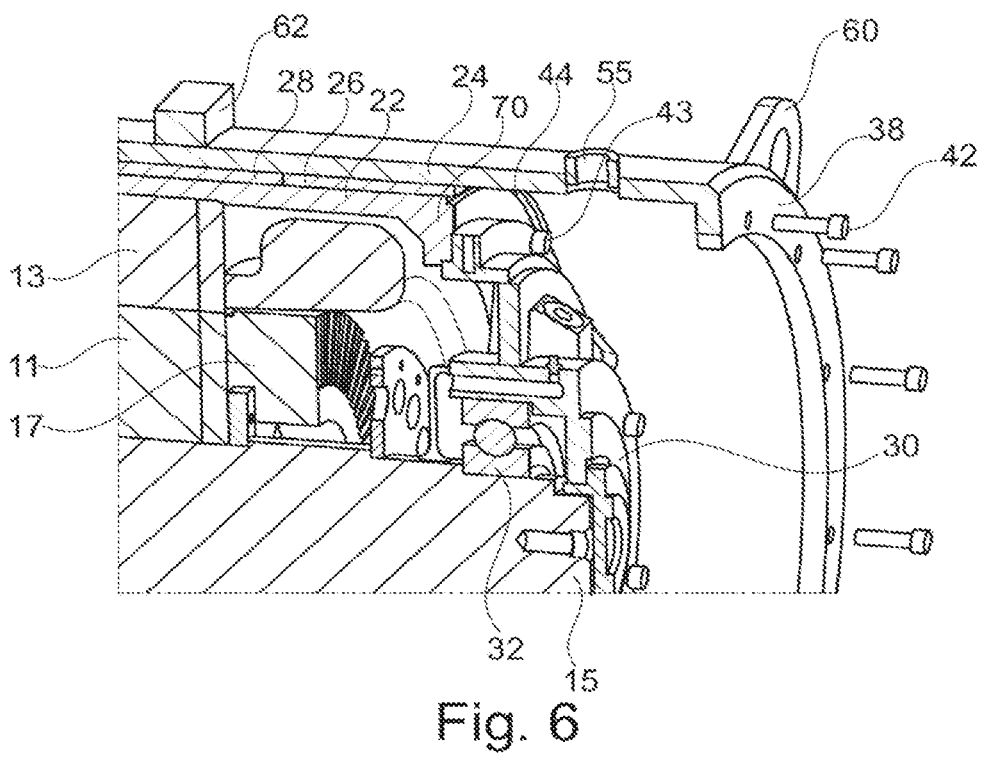
Figure 7:
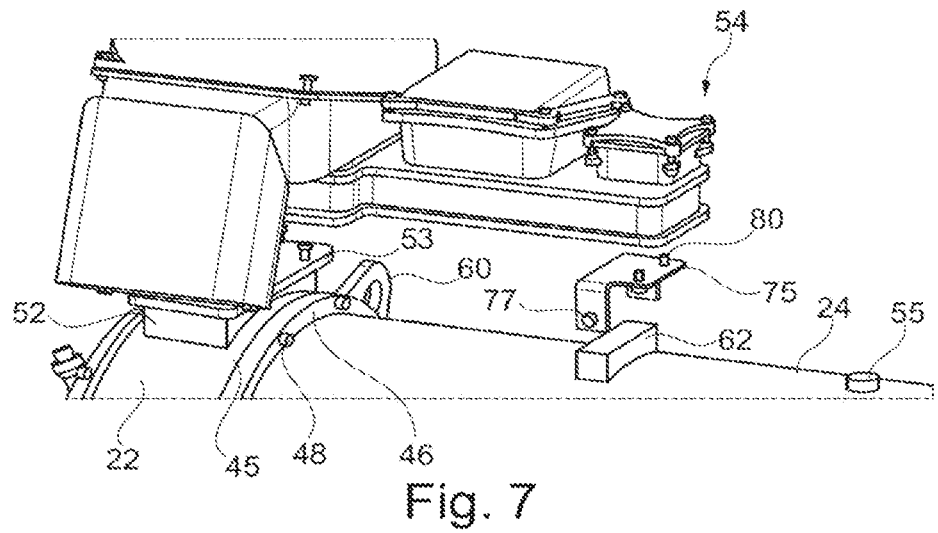
Figure 8:
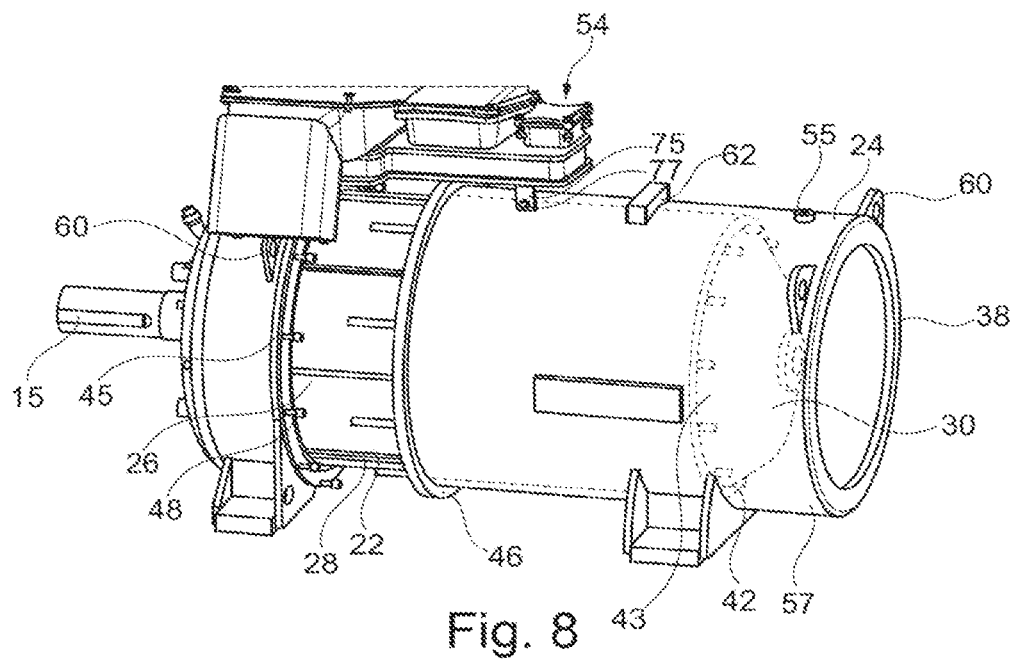
Figure 9:
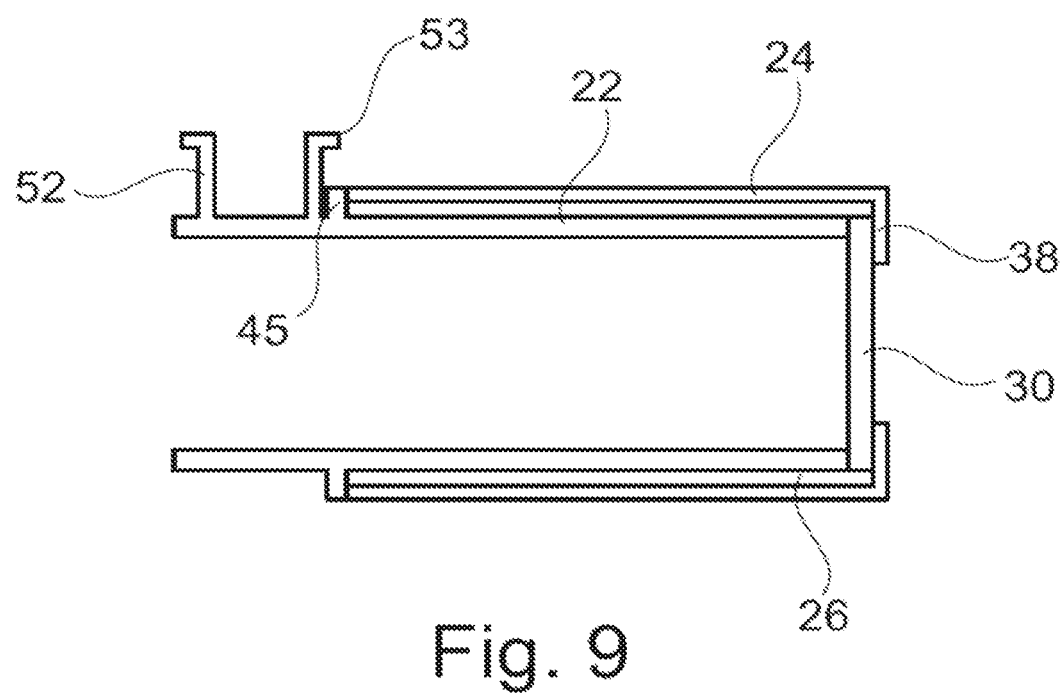

The invention will be understood more clearly by reading the following detailed description of the non-limiting exemplary embodiments thereof, and by examining the accompanying drawing, in which:

FIG. 1 shows schematically in section an electric motor according to the invention, FIG. 2 shows the inner casing of the frame illustrated in FIG. 1, FIG. 3 is a schematic view in section of the assembled inner and outer casings of the frame illustrated in FIG. 1, FIG. 4 is an enlarged view of the end of the motor of FIG. 1, FIG. 5 shows schematically the electric machine according to the invention, FIG. 6 is a schematic view in section of a detail of the electric machine according to the invention illustrating the separation of the casings, FIG. 7 shows schematically the assembly of a terminal box on an electric machine according to the invention, FIG. 8 shows schematically the separation of the inner and outer casings of an electric machine according to the invention, and FIG. 9 shows a variant of the frame according to the invention.

The electric machine 10 shown in FIGS. 1 to 8 is a motor comprising a frame 20 of elongated shape, along a longitudinal axis X, which is closed at its two axial ends by front and rear flanges 30.

The frame 20 surrounds a stator 13, the rotor 11 rotating therein.

The rotor 11 comprises a shaft 15, having a longitudinal axis X, which is guided by bearings 32 borne by the flanges 30 in the conventional manner. The rotor may also comprise fan blades 17 at the front and rear, at its front and rear ends.

The flanges 30 each have a grease nipple 34 to supply the bearings 32 with lubricant.

The frame 20 comprises an inner casing 22 nested in an outer casing 24. The inner casing 22 and the outer casing 24 form together a fluid circulation space 26 extending over the entire circumference of the electric motor 10.

In FIGS. 5 to 8, the outer casing 24 is shown transparently for illustrative purposes.

The circulation of fluid in this space 26 is guided by longitudinal ribs 28.

As visible in FIG. 2, these longitudinal ribs 28 protrude over the external surface of the inner casing 22.

In a variant, not illustrated, the ribs 28 extend from the internal surface of the outer casing 24, or extend from the external surface of the inner casing 22 and from the internal surface of the outer casing 24.

The ribs 28 are distributed equally around the longitudinal axis and extend alternately as far as one or the other of the walls forming the front 45 and rear 38 assembly flanges, axially delimiting the space 26, so as to form chicanes to force the fluid to follow a zigzag path.

The ribs 28 are of uniform section over their entire length.

The frame 20 may comprise between 6 and 16 ribs 28.

The distance d edge to edge between two consecutive ribs 28 is between 6 cm and 30 cm.

The outer casing 24 comprises openings for the inlet of fluid 55 into the circulation space 26 and openings for the outlet of fluid 57 therefrom.

The angular position of the outer casing 24 is set relative to the inner casing using a headless screw 70 which is screwed into a tapped portion 72 of the inner casing 22 and engaged in a corresponding hole of the outer casing 24.

The outer casing 24 comprises a front end wall 46 which is fixed to the front assembly flange 45 of the inner casing 22 by bolts 48. One at least of the front end wall 46 and the front assembly flange 45 comprises, as illustrated in FIGS. 1 and 3, an annular groove 50 receiving an O-ring, not shown. Such a seal makes it possible to ensure the sealing of the fluid circulation space 26 on the side of the front end of the electric motor 10.

As illustrated in FIGS. 4 and 6, the outer casing 24 comprises the rear wall 38 forming an assembly flange which is fixed to a rear end wall 40 of the inner casing 22 by bolts 42.

The rear end wall 40 may comprise, as illustrated in FIGS. 1 and 4, an annular groove 44 which is arranged opposite the rear end wall 38 of the outer casing 24 and receives an O-ring, not shown. Such a seal makes it possible to ensure the sealing of the assembly between the casings on the side of the rear end of the electric motor 10.

The rear flange 30 of the motor 10 comes into contact with the rear end wall 40 of the inner casing 22 and is fixed to the rear end wall 40 of the inner casing 22 by bolts 43.

The rear end wall 38 of the outer casing 24 is superposed at least partially radially on the rear flange 30, forming therewith a radial clearance e, for example of between 0.5 mm and 5 mm, for example substantially equal to 2 mm. The rear flange 30 and the rear end wall 38 of the outer casing 24 are not superposed.

The outer casing 24 axially covers the inner casing 22 over a length l which is less than that L of the inner casing 22. Thus a part of the inner casing 22 is exposed relative to the outer casing 24 so as to be able to bear, in particular, a terminal box 54 without the removal thereof being necessary for the separation of the inner casing 22 and the outer casing 24.

In this part of the inner casing, which is not covered by the outer casing 24, the inner casing 22 has a passage for cables 52 toward a terminal box 54. The passage for cables 52 comprises an assembly flange 53 of the terminal box 54, the terminal box 54 being fixed thereto by bolts 56 as is shown in FIGS. 1, 5, 7 and 8.

In the illustrated example, the terminal box 54 extends to the rear of the motor in the extension of the part of the frame 20 in which the two casings 22 and 24 are superposed.

As illustrated in FIG. 7, the outer casing 24 may comprise a support 62 of the terminal box 54, a U-shaped bracket 75 being fixed thereto for fixing the terminal box 54 to the support 54. The arms of the U-shaped bracket 75 are fixed to the lateral walls of the support 62 by bolts 77 and the base of the U-shaped bracket 75 is fixed to the terminal box 54 by bolts 80. It is thus possible to remove the bolts 77 in a simple manner so as to detach the U-shaped bracket 75 in a simple manner from the outer casing 24 without having to separate it from the terminal box 54. Thus it is not necessary to remove the terminal box 54 in order to separate the two casings 22 and 24.

The casings 22 and 24 have lifting lugs 60.

The two casings 22 and 24 may be produced by machining a single cylindrical tube made of stainless steel, the inner casing being produced in a first portion of the tube and the outer casing in a second portion of the tube located in the extension of the first portion. However, this may be carried out differently.

In order to inspect the fluid circulation space 26, as illustrated in FIGS. 6 and 8, the user may
- empty the fluid circulation space 26 by evacuating the fluid via the fluid outlet orifice 57,
- unscrew the bolts 42, 48 and 77 in order to detach the outer casing 24 from the inner casing 22 and from the U-shaped bracket 75,
- slide the outer casing 24 to the rear on the inner casing 22 so as to open up the space 26 between the two casings.

Once the inspection is finished, the user may easily reassemble the frame by carrying out the reverse procedure.

The user thus does not have to remove the rear flange 30 or the terminal box 54 in order to carry out the inspection.

In the variant illustrated in FIG. 9, the rear end wall 38 of the outer casing 24 extends to the rear of the inner casing 22 and of the rear flange 30. The rear end wall may be fixed by a bolted connection to the rear flange 30. The rear end wall is thus able to slide to the rear without being prevented from doing so by the rear flange, which prevents it being necessary to remove said rear flange in order to inspect the fluid circulation space 26.

The invention claimed is:

1. A double-casing frame of an electric machine which is cooled by a fluid circulating inside the double casing, comprising:
    an inner casing;
    an end flange mounted on the inner casing at a rear; and
    an outer casing which fits over a front of the inner casing and is separable from the inner casing without removing the end flange by sliding the outer casing to the rear along the inner casing, the outer casing and the inner casing defining between them a fluid circulation space, the outer casing having a rear end wall oriented perpendicularly to an axis of rotation of the electric machine and at least partially covering the inner casing, the outer casing forming with the end flange a radial clearance e.

2. The frame as claimed in claim 1, the inner casing having a rear end wall oriented perpendicularly to an axis of the rotation of the electrical machine and covering the end flange over a part of its height, the end flange being mounted on the rear end wall of the inner casing.

3. The frame as claimed in claim 1, the outer casing being removably fixed to the inner casing and/or to the end flange.

4. The frame as claimed in claim 1, the radial clearance being between 0.5 mm and 5 mm.

5. The frame as claimed in claim 1, the end flange not having any elements for fixing to the outer casing.

6. The frame as claimed in claim 1, the outer casing at least partially covering the end flange.

7. The frame as claimed in claim 1, the outer casing covering the inner casing over only a part of its length.

8. The frame as claimed in claim 7, the inner casing and the outer casing being made of stainless steel.

9. The frame as claimed in claim 1, the inner casing comprising a front assembly flange, a front end wall of the outer casing being fixed thereto.

10. The frame as claimed in claim 1, the inner casing comprising a passage for cables toward a terminal box of the electrical machine, the terminal box being mounted thereon, and the passage for cables being in front of the outer casing.

11. The frame as claimed in claim 1, the outer casing comprising a terminal box support, the terminal box of the electrical machine being removably fixed thereto.

12. The frame as claimed in claim 1, an external surface of the inner casing and/or an internal surface of the outer casing having ribs forming chicanes in the fluid circulation space.

13. The frame as claimed in claim 12, the ribs being longitudinal.

14. The frame as claimed in claim 1, comprising a seal between a rear end wall of the inner casing and the rear end wall of the outer casing.

15. The frame as claimed in claim 1, comprising at least one headless screw borne by one of the inner casings and the outer casing comprising a drilled hole into which this screw may be engaged.

16. The frame as claimed in claim 1, the inner casing and/or the outer casing comprising lifting lugs for the frame.

17. The frame as claimed in claim 1, the outer casing comprising an orifice for an inlet of fluid into the fluid circulation space and an orifice for an outlet of fluid from the fluid circulation space.

18. A double-casing electric machine which is cooled by a fluid circulating inside the double casing, comprising a frame, as claimed in claim 1.

19. The double-casing electric machine as claimed in claim 18, comprising a terminal box which is fixed to the inner casing.

20. The double-casing electric machine as claimed in claim 19, the outer casing being separable from the inner casing without removing the terminal box from the inner casing.

21. The double-casing electric machine as claimed in claim 19, the terminal box being removably fixed to the outer casing.

22. A method for inspecting the fluid circulation space of a frame of an electric machine, as claimed in claim 1, comprising the steps consisting in unscrewing bolts for fixing the outer casing to the inner casing and then removing the outer casing and inspecting the fluid circulation space in order to check an absence of undesirable elements.

* * * * *